United States Patent
Kim et al.

(10) Patent No.: US 12,244,848 B2
(45) Date of Patent: Mar. 4, 2025

(54) APPARATUS AND METHOD WITH VIDEO PROCESSING

(71) Applicant: SAMSUNG ELECTRONICS CO., LTD., Suwon-si (KR)

(72) Inventors: Seungeon Kim, Suwon-si (KR); Wonhee Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 219 days.

(21) Appl. No.: 18/093,377

(22) Filed: Jan. 5, 2023

(65) Prior Publication Data

US 2024/0089486 A1  Mar. 14, 2024

(30) Foreign Application Priority Data

Sep. 8, 2022  (KR) .................. 10-2022-0114399

(51) Int. Cl.
| | |
|---|---|
| *H04N 19/513* | (2014.01) |
| *H04N 19/105* | (2014.01) |
| *H04N 19/137* | (2014.01) |
| *H04N 19/172* | (2014.01) |

(52) U.S. Cl.
CPC ......... *H04N 19/513* (2014.11); *H04N 19/105* (2014.11); *H04N 19/137* (2014.11); *H04N 19/172* (2014.11)

(58) Field of Classification Search
CPC .. H04N 19/513; H04N 19/105; H04N 19/137; H04N 19/172; H04N 19/573; H04N 19/51; H04N 19/44; H04N 19/52; H04N 19/61; H04N 19/91; G06N 3/08; G06T 9/002

See application file for complete search history.

(56) References Cited

U.S. PATENT DOCUMENTS

| | | |
|---|---|---|
| 10,771,807 B1 | 9/2020 | Ulaganathan et al. |
| 11,128,864 B2 | 9/2021 | Galpin et al. |
| 2010/0239019 A1 | 9/2010 | Bock et al. |

(Continued)

FOREIGN PATENT DOCUMENTS

KR  10-2023-0060029 A  5/2023

OTHER PUBLICATIONS

Lu, Guo, et al. "DVC: An End-to-end Deep Video Compression Framework." Proceedings of the IEEE/CVF Conference on Computer Vision and Pattern Recognition., arXiv:1812.00101v3 [eess. IV] Apr. 7, 2019, (14 pages).

(Continued)

*Primary Examiner* — Farzana Hossain
(74) *Attorney, Agent, or Firm* — NSIP Law

(57) ABSTRACT

Disclosed are an apparatus and method with video processing. A computing apparatus includes one or more processors and storage storing instructions configured to, when executed by the one or more processors, cause the one or more processors to: generate cluster maps using clusters generated by performing clustering, wherein the generating the cluster maps performed based on a reference frame of a video generated based on a previous point in time of the video, generate a predicted frame by performing motion compensation based on the cluster maps, and generate a decoded frame by performing decoding based on the current frame and the predicted frame.

20 Claims, 16 Drawing Sheets

(56) References Cited

U.S. PATENT DOCUMENTS

| | | | | |
|---|---|---|---|---|
| 2014/0063247 A1* | 3/2014 | Bernal | ............... | G06V 20/54 |
| | | | | 348/148 |
| 2014/0071286 A1* | 3/2014 | Bernal | ............... | G06T 7/223 |
| | | | | 348/149 |
| 2015/0117540 A1* | 4/2015 | Morimoto | ............ | H04N 19/543 |
| | | | | 375/240.16 |
| 2015/0117704 A1* | 4/2015 | Bulan | ............... | G06T 7/269 |
| | | | | 382/103 |
| 2021/0203961 A1 | 7/2021 | Liao et al. | | |
| 2023/0132106 A1 | 4/2023 | Kim et al. | | |
| 2024/0163426 A1* | 5/2024 | Oh | ............... | H04N 19/172 |

OTHER PUBLICATIONS

Meuel, Holger, et al. "Optical Flow Cluster Filtering for ROI Coding." 2013 Picture Coding Symposium (PCS). IEEE, 2013., (4 pages).

Extended European search report issued on Jan. 12, 2024, in counterpart European Patent Application No. 23161341.5 (8 pages).

Wang et al. "Three-zone segmentation-based motion compensation for video compression." *IEEE Transactions on Image Processing* vol. 28 No. 10, Oct. 2019 (pp. 5091-5104).

Agustsson et al. "Scale-space flow for end-to-end optimized video compression." *Proceedings of the IEEE/CVF Conference on Computer Vision and Pattern Recognition.* 2020 (pp. 8503-8512).

* cited by examiner

APPARATUS AND METHOD WITH VIDEO PROCESSING

CROSS-REFERENCE TO RELATED APPLICATIONS

This application claims the benefit under 35 USC § 119(a) of Korean Patent Application No. 10-2022-0114399, filed on Sep. 8, 2022, in the Korean Intellectual Property Office, the entire disclosure of which is incorporated herein by reference for all purposes.

BACKGROUND

1. Field

The following description relates to an apparatus and method with video processing.

2. Description of Related Art

Video compression technology using deep learning is being studied to improve video compression rates.

Conventional video compression methods apply a motion compensation technique to previously transmitted frames based on motion information between (i) frames previously transmitted by an encoder or received by a decoder and (ii) frames to be currently transmitted in order to remove temporal redundancy of successive frames. This inter-frame motion-based compression allows generating a predicted frame for a current frame and encoding and transmitting only a residual (difference) between the predicted frame and the current frame, thereby reducing the size of transmitted video data.

However, the conventional methods incur an additional cost of transmitting an optical flow for each pixel to the decoder and thus, increase the amount of data to be transmitted. In addition, the methods have difficulties in dealing with coding units with various objects in complex shapes and have a limit in parameter tuning.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a computing apparatus, includes one or more processors and storage storing instructions configured to, when executed by the one or more processors, cause the one or more processors to: generate cluster maps using clusters generated by performing clustering, wherein the generating the cluster maps performed based on a reference frame of a video generated based on a previous point in time of the video, generate a predicted frame by performing motion compensation based on the cluster maps, and generate a decoded frame by performing decoding based on the current frame and the predicted frame.

The reference frame may be generated based on a decoded frame of the previous point in time.

The one or more processors may be configured to estimate motion vectors corresponding to the plurality of clusters based on the reference frame, the current frame, and the cluster maps.

The one or more processors may be configured to generate the predicted frame by compensating the reference frame based on the cluster maps and the motion vectors.

The one or more processors may be configured to motion-compensate the reference frame using the sum of the plurality of motion vectors, or motion-compensate the reference frame using a pixel-wise motion vector by performing warping based on the plurality of cluster maps and the plurality of motion vectors.

The one or more processors may be configured to calculate an assignment probability for clustering based on the reference frame, calculate an optical flow based on the reference frame and the current frame, and generate a representative motion vector of the plurality of clusters based on the assignment probability and the optical flow.

The one or more processors may be configured to calculate an average of optical flows corresponding to the plurality of clusters based on the assignment probability and the optical flow, and calculate an accuracy of the assignment probability based on a difference between the average and an optical flow corresponding to a pixel assigned to the clusters.

The one or more processors may be configured to generate a residual based on the current frame and the predicted frame, generate an encoded residual by encoding the residual, and generate a decoded residual by decoding the encoded residual.

The one or more processors may be configured to generate the decoded frame based on the predicted frame and the decoded residual.

The one or more processors may be configured to generate a first motion vector corresponding to the clusters based on the reference frame, the current frame, and the cluster maps, generate a second motion vector corresponding to a pixel based on an assignment probability corresponding to the clusters and the first motion vector, calculate a motion residual based on the reference frame, the current frame, and the second motion vector, and generate the predicted frame by performing the motion compensation based on the motion residual and the second motion vector.

In another general aspect, a video processing method includes receiving a current frame of a video and a reference frame generated based on a previous point in time of the video, generating a cluster maps using a clusters, the clusters generated by performing clustering based on the reference frame, generating a predicted frame by performing motion compensation based on the cluster maps, and generating a decoded frame by performing decoding based on the current frame and the predicted frame.

The reference frame may be generated based on a decoded frame of the previous point in time.

The generating of the predicted frame may include estimating a motion vectors corresponding to the clusters based on the reference frame, the current frame, and the cluster maps.

The generating of the predicted frame may include generating the predicted frame by compensating the reference frame based on the cluster maps and the motion vectors.

The generating of the predicted frame may include compensating the reference frame using a sum of the motion vectors, or compensating the reference frame using a pixel-wise motion vector by performing warping based on the cluster maps and the motion vectors.

The generating of the cluster maps may include calculating an assignment probability for clustering based on the reference frame, calculating an optical flow based on the reference frame and the current frame, and generating a representative motion vector of the clusters based on the assignment probability and the optical flow.

The generating of the cluster maps may include calculating an average of optical flows corresponding to the clusters based on the assignment probability and the optical flow, and calculating an accuracy of the assignment probability based on a difference between the average and an optical flow corresponding to a pixel assigned to the clusters.

The generating of the decoded frame may include generating a residual based on the current frame and the predicted frame, generating an encoded residual by encoding the residual, and generating a decoded residual by decoding the encoded residual.

The generating of the decoded frame may further include generating the decoded frame based on the predicted frame and the decoded residual.

The generating of the predicted frame may include generating a first motion vector corresponding to the clusters based on the reference frame, the current frame, and the cluster maps, generating a second motion vector corresponding to a pixel based on an assignment probability corresponding to the clusters and the first motion vector, calculating a motion residual based on the reference frame, the current frame, and the second motion vector, and generating the predicted frame by performing the motion compensation based on the motion residual and the second motion vector.

Other features and aspects will be apparent from the following detailed description, the drawings, and the claims.

DETAILED DESCRIPTION

Figure 1:
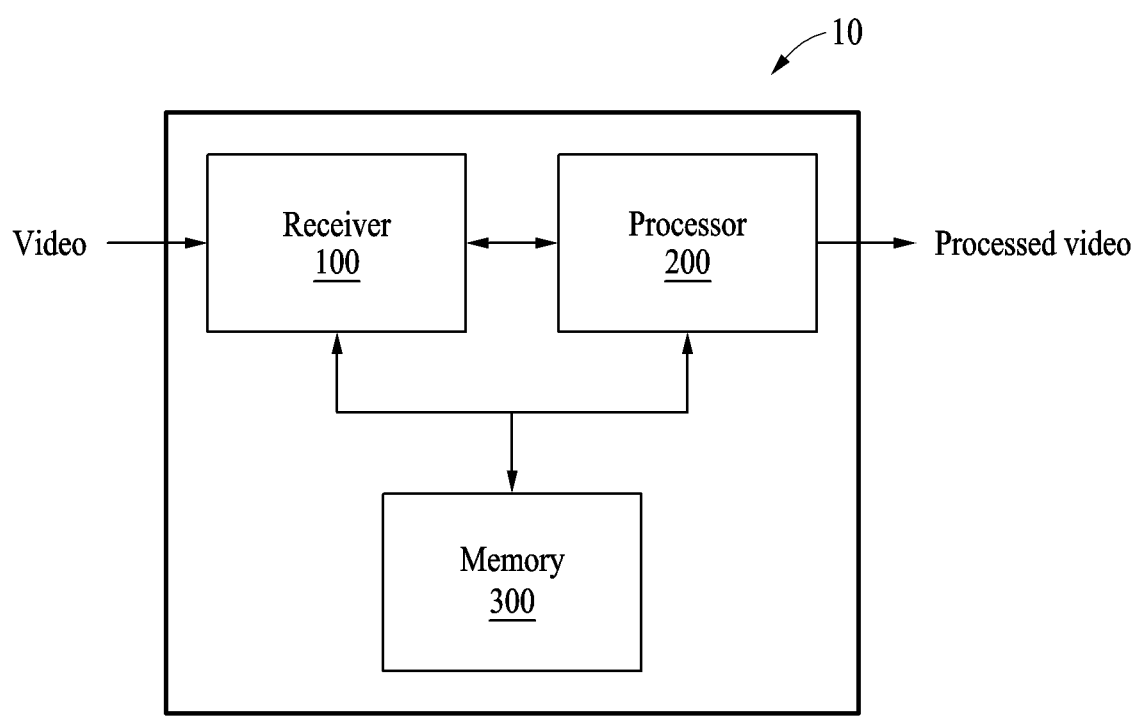
FIG. 1 illustrates an example of a video processing apparatus, according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Hereinafter, the examples will be described in detail with reference to the accompanying drawings. When describing the examples with reference to the accompanying drawings, like reference numerals refer to like elements and a repeated description related thereto is omitted.

FIG. 1 illustrates an example of a video processing apparatus, according to one or more embodiments.

Referring to FIG. 1, a video processing apparatus 10 may process a video. The video may include a images or frames.

The video processing apparatus 10 may compress the video. The video processing apparatus 10 (or another similarly configured apparatus) may decompress the compressed video. The video processing apparatus 10 may encode and/or decode the video.

The video processing apparatus 10 may process the video using one or more neural networks, and of which. The neural network (representative any neural networks that may be used) may be a general model that has the ability to solve a problem, where artificial neurons (nodes) forming the network through synaptic combinations (inter-node connections) change connection strengths of synapses/nodes through training.

A neuron/node of the neural network may include a combination of weights or biases. The neural network may include one or more layers, each including one or more neurons or nodes. The neural network may infer a result from a predetermined input and based on the result change the weights of the neurons through training.

The neural network may include a deep neural network (DNN). The neural network may be a convolutional neural network (CNN), a recurrent neural network (RNN), a perceptron, a multilayer perceptron, a feed forward (FF), a radial basis network (RBF), a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and an attention network (AN).

The video processing apparatus 10 may be implemented in a personal computer (PC), a data server, or a portable device, to name some examples.

A portable device may be implemented as a laptop computer, a mobile phone, a smart phone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld game console, an e-book, or a smart device. A smart device may be implemented as a smart watch, a smart band, or a smart ring.

The video processing apparatus 10 may include a receiver 100 and a processor 200. The video processing apparatus 10 may further include a memory 300. The term "processor" is used in the singular herein for convenience to mean "one or more processors", i.e., "a/the processor" refers to any processor or any combination of processors.

The receiver 100 may include a receiving interface. The receiver 100 may receive a current frame of a video and a reference frame generated based on a previous point in time of the video. The receiver 100 may output the current frame and the reference frame to the processor 200.

The processor 200 may process data stored in the memory 300. The processor 200 may execute a computer-readable code (e.g., software) stored in the memory 300 and instructions triggered by the processor 200.

The processor 200 may be a hardware-implemented data processing device having a circuit that is physically structured to execute desired operations. The desired operations may include, for example, codes or instructions included in a program.

The hardware-implemented data processing apparatus may include, for example, a microprocessor, a central processing unit (CPU), a processor core, a multi-core processor, a multiprocessor, an application-specific integrated circuit (ASIC), and a field-programmable gate array (FPGA), to name some examples.

The processor 200 may generate a cluster maps using a clusters generated by performing clustering based on the reference frame. The reference frame may be generated based on a decoded frame of the previous point in time.

The processor 200 may calculate an assignment probability for clustering based on the reference frame. The processor 200 may calculate an optical flow based on the reference frame and the current frame. The processor 200 may generate a representative motion vector of the clusters based on the assignment probability and the optical flow.

The processor 200 may calculate an average of optical flows corresponding to the clusters based on the assignment probability and the optical flow. The processor 200 may calculate an accuracy of the assignment probability based on a difference between the average and an optical flow corresponding to a pixel assigned to the clusters. The process of calculating the accuracy of the assignment probability will be described in detail with reference to FIG. 3.

The processor 200 may estimate a motion vectors corresponding to the clusters based on the reference frame, the current frame, and the cluster maps.

The processor 200 may generate a predicted frame by performing motion compensation based on the cluster maps. The processor 200 may generate the predicted frame by compensating the reference frame based on the cluster maps and the motion vectors.

The processor 200 may compensate the reference frame using the sum of the motion vectors. Alternatively, the processor 200 may compensate the reference frame using a pixel-wise motion vector by performing warping based on the cluster maps and the motion vectors.

The processor 200 may generate a decoded frame by performing decoding based on the current frame and the predicted frame.

The processor 200 may generate a residual based on the current frame and the predicted frame. The processor 200 may generate an encoded residual by encoding the residual. The processor 200 may generate a decoded residual by decoding the encoded residual.

The processor 200 may generate the decoded frame based on the predicted frame and the decoded residual.

The processor 200 may generate a first motion vector corresponding to the clusters based on the reference frame, the current frame, and the cluster maps. The processor 200 may generate a second motion vector corresponding to a pixel based on an assignment probability corresponding to the clusters and the first motion vector.

The processor 200 may calculate a motion residual based on the reference frame, the current frame, and the second motion vector. The processor 200 may generate the predicted frame by performing the motion compensation based on the motion residual and the second motion vector.

The memory 300 may store data for an operation or an operation result. The memory 300 may store instructions (or programs) executable by the processor 200. For example, the instructions may include instructions for executing an operation of the processor and/or instructions for performing an operation of each component of the processor.

The memory 300 may be implemented as a volatile memory device or a non-volatile memory device.

Volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

Non-volatile memory device may be implemented as an electrically erasable programmable read-only memory (EEPROM), a flash memory, a magnetic RAM (M RAM), a spin-transfer torque (STT)-M RAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory.

Figure 2:
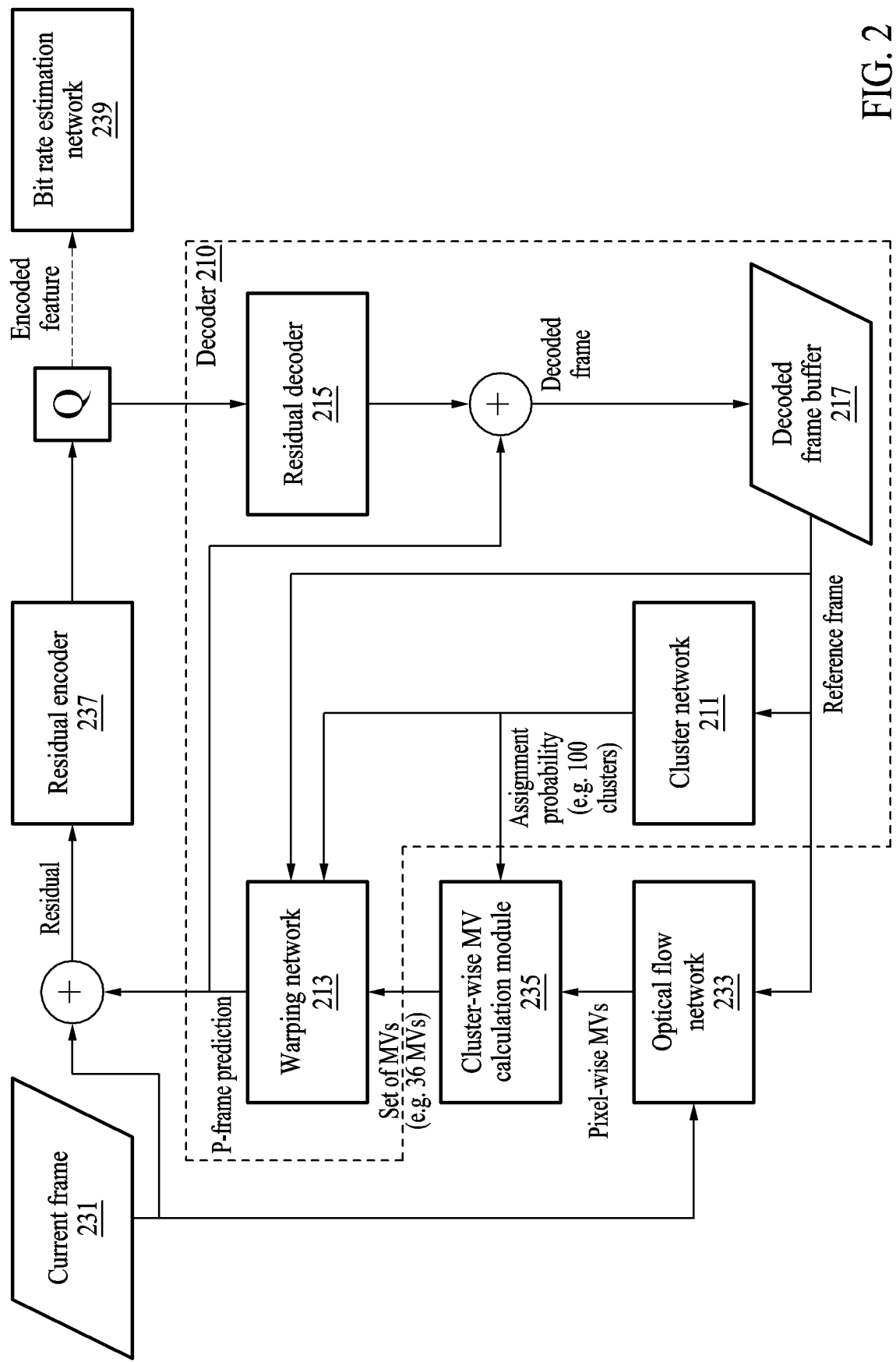
FIG. 2 illustrates an example of an operation of the video processing apparatus of FIG. 1, according to one or more embodiments.

FIG. 2 illustrates an example of an operation of the video processing apparatus of FIG. 1, according to one or more embodiments.

Referring to FIG. 2, a processor (e.g., the processor 200 of FIG. 1) may compress a video using deep learning. Specifically, the processor 200 may compress and transmit motion information of the video by performing clustering using a neural network.

On average, neighboring pixels in a frame of the video may have similar direction and magnitude of motion. In particular, adjacent pixels within the same object may have highly similar direction and magnitude of motion (hereafter "motion" will, unless the context suggests otherwise, refer to direction and magnitude). Considering that motions of adjacent pixels are similar, the processor 200 may group pixels with similar motion as a cluster and transmit only representative motion information of the cluster rather than all of the pixels in the cluster, thereby improving video compression performance and reducing data transmission overhead. The processor 200 may improve the compression performance by performing cluster-wise motion compensation.

The processor 200 may compress the video by performing clustering on frames of the input video using a neural network. The processor 200 may compress the video using motion information, for example predicted frames (P-frames), bidirectional frames (B-frames), and/or intra-frames (I-frames), which are known types of compressed frames.

In the example of FIG. 2, the processor 200 may include an encoder, which may include a decoder 210. The encoder may be a video encoder that performs compression on a stream of video frames and is to be distinguished from the residual encoder 237 described below. The decoder 210 may include a cluster network 211, a warping network 213, and a residual decoder 215. The encoder may include an optical flow network 233, a cluster-wise motion vector (MV) calculation module 235, the residual encoder 237, and a bit rate estimation network 239.

Using the optical flow network 233, the encoder may obtain pixel-wise motion information between a current frame 231 to be compressed and transmitted and a frame (e.g., a reference frame) stored in a frame buffer and decoded (for example, using the same overall technique) at a previous point in time. That is, the optical flow network 233 may obtain motions of pixels of a current frame 231 relative to pixels of a recently decoded frame.

The cluster network 211 may generate clusters. In the example of FIG. 2, the cluster network 211 generates "100" clusters, but a different number of clusters may be generated according to an example. The cluster network 211 may estimate a clustering assignment probability of a pixel (or an assignment probability) based on the reference frame as an input. The assignment probabilities (for respective pixels) may be the probabilities that the pixels of a frame are assigned to (or belong to) a predetermined cluster.

The processor 200 may train the cluster network 211 by unsupervised learning. The process of training the cluster network 211 is described in detail with reference to FIG. 3.

The cluster-wise MV calculation module 235 may generate a cluster-wise representative motion vector using the pixel-wise motion information from the optical flow network 233 and the assignment probability from the cluster network 211. For example, the cluster-wise MV calculation module 235 may generate a motion vector using an average value of motions of pixels assigned to the same cluster (which may be done for multiple pixels and motion vectors for the same current frame). In other words, motion vectors are assigned to their best-fitting clusters, resulting in clusters of motion vectors, and each such motion vector cluster is then represented by an average of its members. In the example of FIG. 2, such consolidation results in the number of motion vectors from the optical flow network 233 being reduced to "36" motion vectors, but different numbers of motion vectors may arise for different frames, examples, implementations, etc.

The warping network 213 may warp the reference frame to be similar to the current frame 231 using cluster-wise motion information. The warping network 213 may generate a predicted frame through warping. The warping network 213 may reduce the amount/size of residuals included in information to be transmitted through a communication channel by warping, thereby reducing the amount of information to be transmitted for the current frame.

A residual corresponding to the current frame 231 may be derived based on the current frame 231 and frame predicted by warping (e.g., a predicted P-frame). The encoder may use the residual encoder 237 to transform the residual into a more-compressed latent vector Q. The encoder may transmit, to the decoder 210, (i) the latent vector Q to the decoder 210 (e.g., to the residual decoder 215) together with (ii) the previously generated cluster-wise motion information (e.g., a P-frame predicted by the warping network 213 may be provided to the adder of the decoder 210). The residual decoder 215 may restore the residual from the latent vector Q; the restored residual to be used to obtain a decoded reference frame of a subsequent point in time. Specifically, the decoder 210 may generate the decoded/reference frame by adding the restored residual (from the residual decoder 215) and the predicted frame (output from the warping network 213). The decoder 210 may store the decoded frame in the decoded frame buffer 217 for subsequent use as a reference frame. In order to increase the efficiency of data transmission and reception, lossless coding may be used for further compression. For example, entropy coding may be used for further compression of the latent vector and the cluster-wise motion information.

As noted, an input of the decoder 210 may include the latent vector Q of the residual and the cluster-wise motion information. The decoder 210 may receive the reference frame from the decoded frame buffer 217 that is autonomously stored. In an ideal communication situation (e.g., when there are no errors introduced by communication), the reference frame of the encoder and the reference frame of the decoder may be the same.

The decoder 210 may obtain the assignment probability using the reference frame as an input of the cluster network 211. The decoder 210 may generate a predicted frame (e.g., a P-frame) corresponding to the current frame 231 using received cluster-wise representative motion information (e.g., the cluster-wise motion information), pixel-wise clustering probability (e.g., the assignment probability), and the reference frame as an input of the warping network 213.

The decoder 210 may convert the latent vector of the residual into a residual image through the residual decoder 215, generate a decoded frame by adding the residual image to the previously generated predicted frame, and provide the decoded frame to a user.

Figure 3:
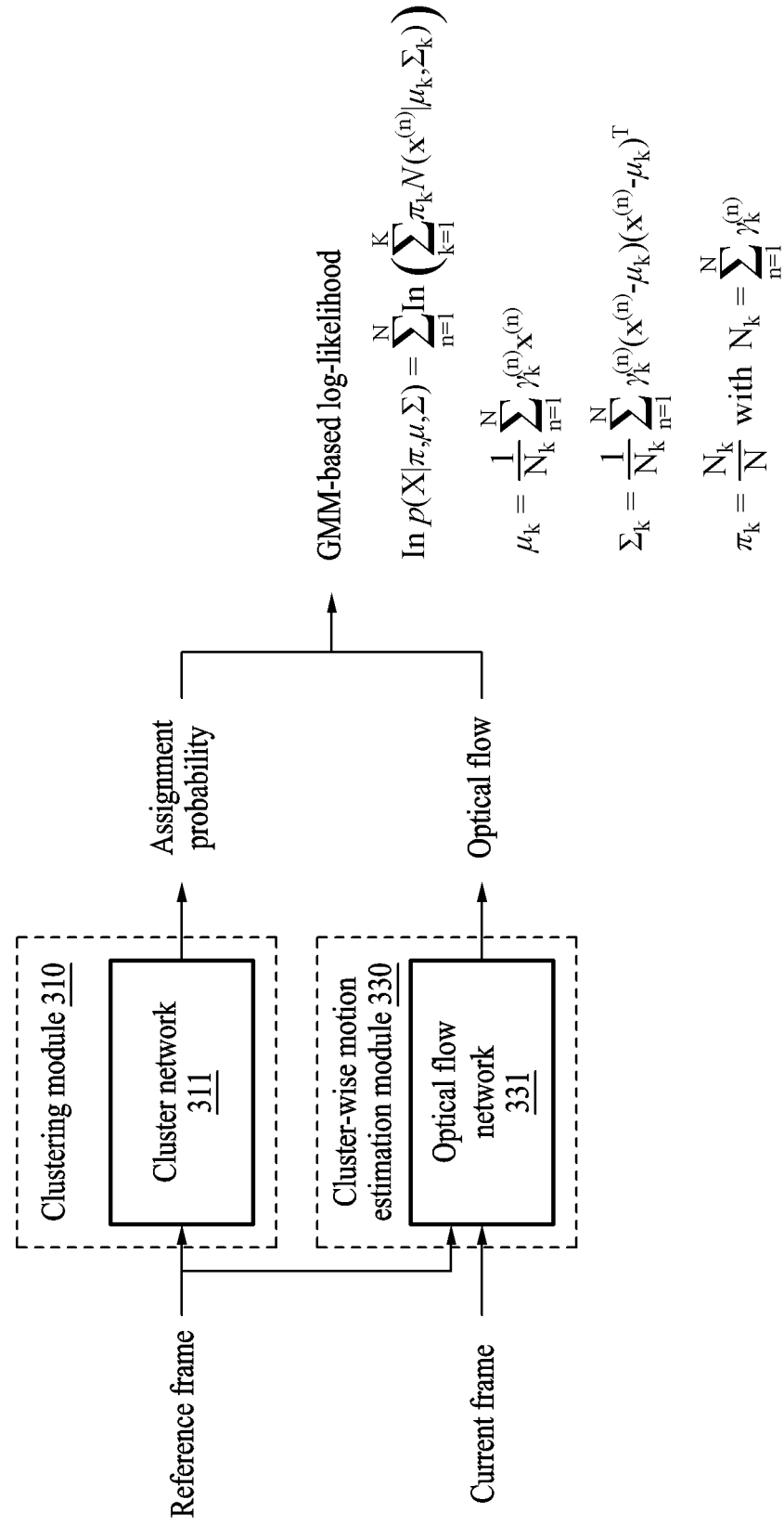
FIG. 3 illustrates an example of an operation of a cluster network and an operation of an optical flow network, according to one or more embodiments.

FIG. 3 illustrates an example of an operation of a cluster network and an operation of an optical flow network, according to one or more embodiments.

Referring to FIG. 3, a processor (e.g., the processor 200 of FIG. 1) may perform clustering using one or more neural networks. The processor 200 may train the neural networks for clustering (in some implementations, some of the neural networks may be trained in advance by another system/processor).

The one or more neural networks may include a cluster network 311 and an optical flow network 331. The one or more neural networks may further include a warping network (e.g., the warping network 213 of FIG. 2), a residual encoder (e.g., the residual encoder 237 of FIG. 2), a residual decoder (e.g., the residual decoder 215 of FIG. 2), and a bit rate estimation network (e.g., the bit rate estimation network 239 of FIG. 2). Where suitable, any of the neural networks may be replaced by functionally equivalent algorithms; neural networks are efficient and convenient but it is possible for the functions performed by the neural networks described herein may be provided with components other than neural networks. For example, there are known clustering algorithms that are not neural networks which may be adapted for clustering.

The cluster network 311 may be included in a clustering module 310. The optical flow network 331 may be included in a cluster-wise motion estimation module 330.

The processor 200 may train the one or more neural networks, for example, by supervised learning or unsupervised learning.

The processor 200 may implement a loss function to estimate an optical flow that minimizes a warping error between two images (e.g., a reference frame and a current frame) of different points in time to be used as an input of the optical flow network 331. Alternatively, the processor 200 may train the optical flow network 331 by providing direct supervision using an optical flow label dataset.

The processor 200 may define a self-clustering loss and use the same to train the cluster network 331. The processor 200 may quantify how well the clustering assignment probability models the optical flow of the optical flow network 331 using a Gaussian mixture model (GMM)-based likelihood function. The processor 200 may quantify the degree of modeling by calculating the accuracy of the assignment probability.

The processor 200 may calculate an average of optical flows corresponding to the clusters based on the assignment probability and the optical flow. The processor 200 may calculate an accuracy of the assignment probability based on a difference between the average and an optical flow corresponding to a pixel assigned to the clusters. In detail, the processor 200 may calculate the accuracy of the assignment probability using Equations 1 to 4.

$$\ln p(X|\pi, \mu, \Sigma) = \sum_{n=1}^{N} \ln\left(\sum_{k=1}^{K} \pi_k \mathcal{N}\left(x^{(n)}|\mu_k, \Sigma_k\right)\right) \quad \text{Equation 1}$$

$$\mu_k = \frac{1}{N_k} \sum_{n=1}^{N} \gamma_k^{(n)} x^{(n)} \quad \text{Equation 2}$$

$$\Sigma_k = \frac{1}{N_k} \sum_{n=1}^{N} \gamma_k^{(n)} \left(x^{(n)} - \mu_k\right)\left(x^{(n)} - \mu_k\right)^T \quad \text{Equation 3}$$

$$\pi_k = \frac{N_k}{N} \text{ with } N_k = \sum_{n=1}^{N} \gamma_k^{(n)} \quad \text{Equation 4}$$

Here, $\mu_k$ denotes the average of optical flows corresponding to the centers of clusters, $y_k$ denotes the assignment probability, and x denotes an optical flow. N denotes the total number of pixels, and $N_k$ and $pi_k$ are parameters used by GMM, wherein $N_k$ denotes the sum of probabilities that pixels are assigned to a cluster k, and $pi_k$ denotes a relative ratio of each Gaussian in GMM (e.g., the sum of the $pi_k$ terms is "1").

The processor 200 may calculate the accuracy of the assignment probability (estimated by the current cluster network 311) based on the similarity of (i) an optical flow of a pixel assigned to a current cluster to (ii) the average of optical flows corresponding to the centers of clusters. The similarity of an optical flow of a pixel assigned to a cluster may be the probability that a sample is generated in a cluster where pixels are distributed.

The processor 200 may train the cluster network 311 using the reference frame as an input, and may do so without separate label data.

Figure 4:
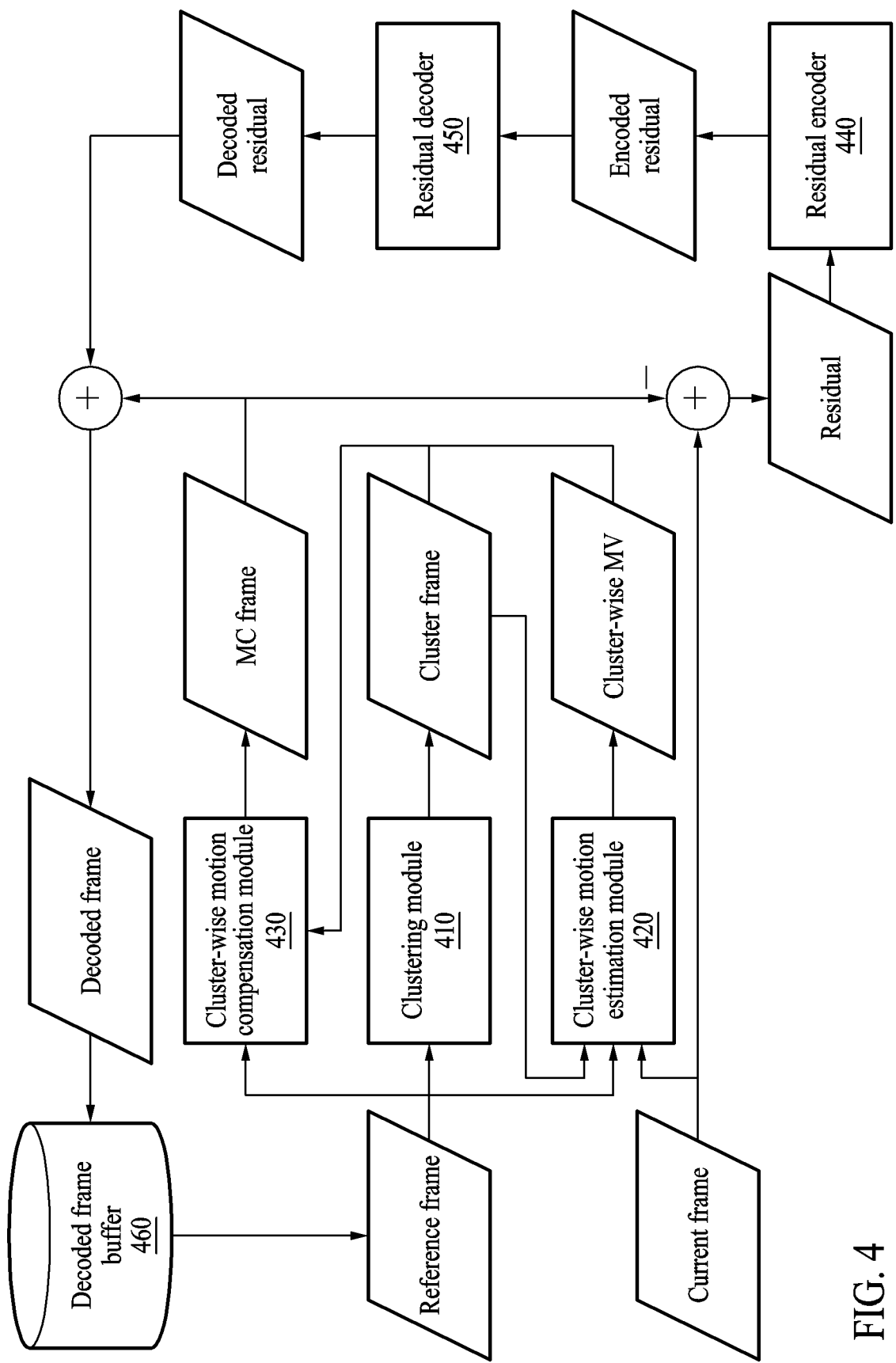
FIG. 4 illustrates an example of implementation of the video processing apparatus of FIG. 1, according to one or more embodiments.

FIG. 4 illustrates an example of implementation of the video processing apparatus of FIG. 1, according to one or more embodiments.

Referring to FIG. 4, a processor (e.g., the processor 200 of FIG. 1) may include a clustering module 410, a cluster-wise motion estimation module 420, a cluster-wise motion compensation module 430, a residual encoder 440, and a residual decoder 450. A memory (e.g., the memory 300 of FIG. 1) may include a decoded frame buffer 460.

The clustering module 410 may estimate a clustering map from a reference frame. The clustering map may be used for motion estimation by the cluster-wise motion estimation module 420 and for motion compensation by the cluster-wise motion compensation module 430.

The cluster-wise motion estimation module 420 may receive the reference frame, a current frame, and the cluster map, and estimate a cluster-wise motion vector therefrom. The cluster-wise motion estimation module 420 may include a pixel-wise motion estimation network and a clustering network. The cluster-wise motion estimation module 420 may calculate the cluster-wise motion vector using outputs of the pixel-wise motion estimation network and the clustering network. The pixel-wise motion estimation module may estimate motion for individual pixels.

The cluster-wise motion compensation module 430 may generate a motion-compensated frame (e.g., the predicted frame, e.g., a P-frame) by transforming the reference frame of a previous point in time to be similar to the current frame based on the reference frame, the motion vector (e.g., the cluster-wise motion vector), and the cluster map.

The residual encoder 440 may receive a residual as an input and generate a bitstream to be transmitted through a communication channel, a storage, etc. The residual decoder 450 may restore the residual from the bitstream. Decoded frames may be stored in the decoded frame buffer 460 to be used at subsequent points in time.

Figure 5:
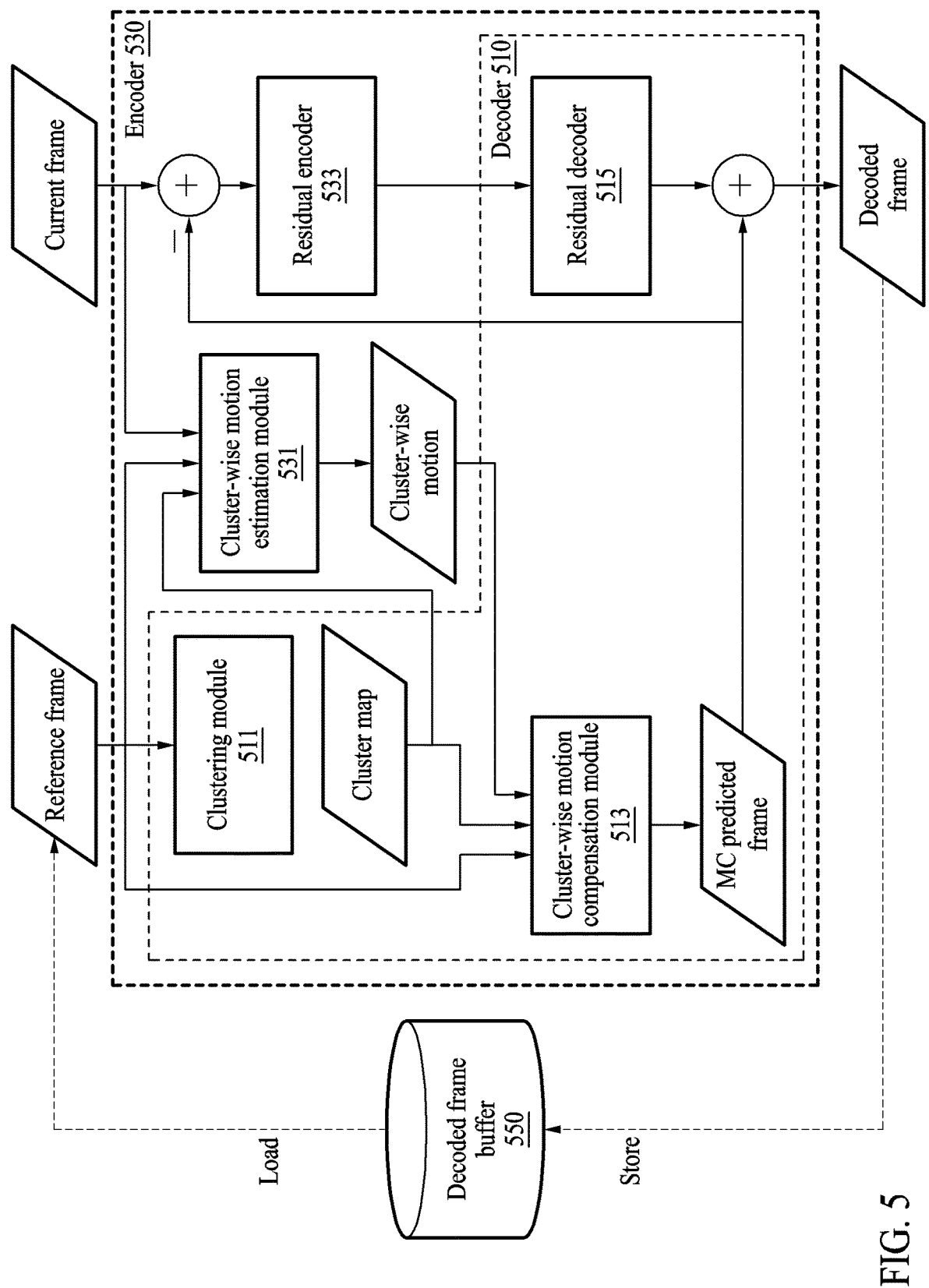
FIG. 5 illustrates an example of a video processing operation, according to one or more embodiments.
Figure 6:
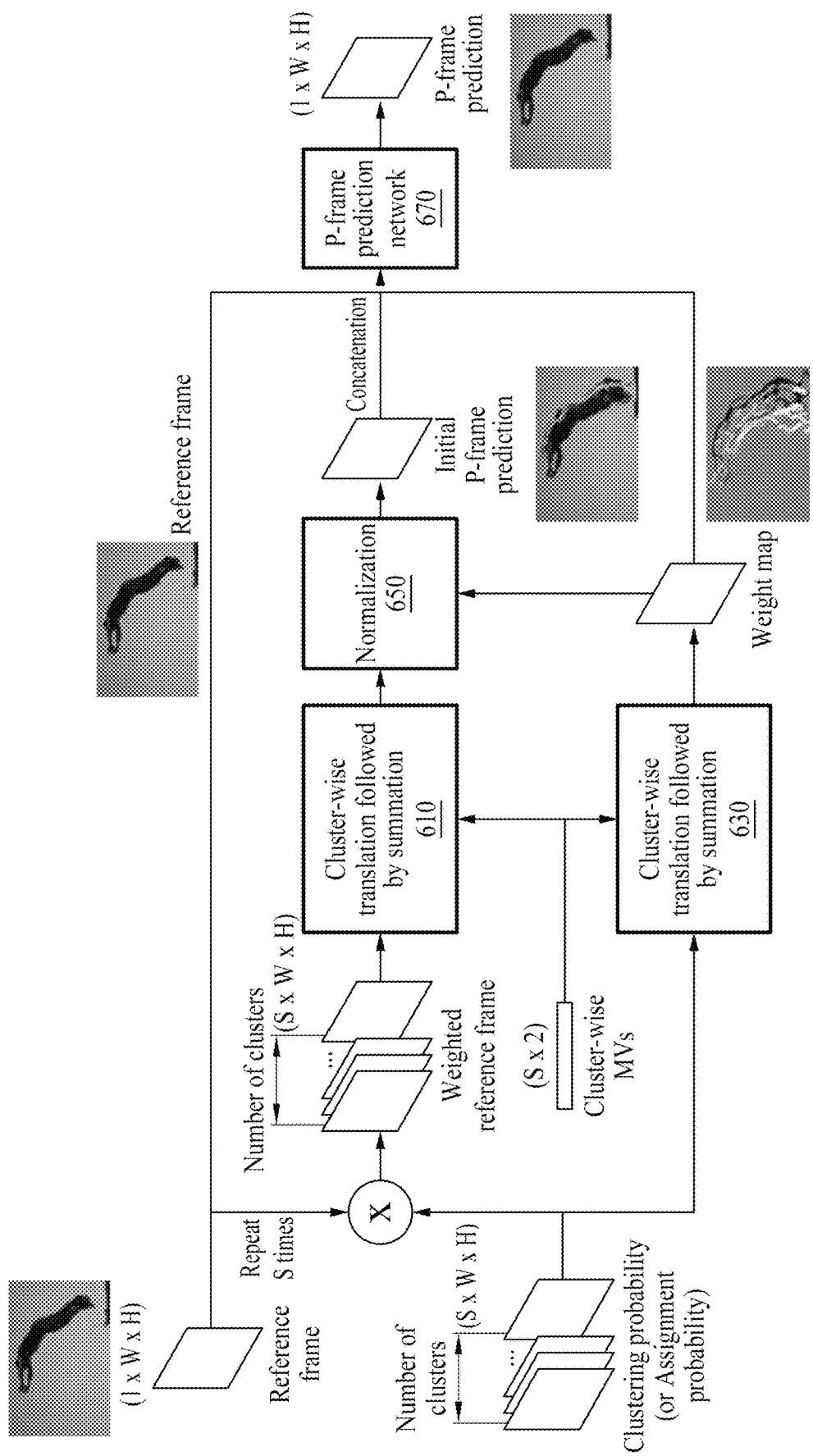
FIG. 6 illustrates an operation of a cluster-wise motion compensation module, according to one or more embodiments.

FIG. 5 illustrates an example of a video processing operation, and FIG. 6 illustrates an operation of a cluster-wise motion compensation module, according to one or more embodiments.

Referring to FIGS. 5 and 6, a processor (e.g., the processor 200 of FIG. 1) may compress a video and/or decompress a video using a decoder 510 and an encoder 530.

The encoder 530 may include the decoder 510. The decoder 510 may include a clustering module 511, a cluster-wise motion compensation module 513, and a residual decoder 515. The encoder 530 may include a cluster-wise motion estimation module 531 and a residual encoder 533.

The encoder 530 may perform clustering through the clustering module 511 using a reference frame as an input. The clustering module 511 may calculate a cluster-wise motion vector based on a cluster map. The clustering module 511 may generate the cluster map using a cluster-wise optical flow by color-mapping a motion vector to each cluster.

In the cluster map, an area expected to have a complex shape or complex motion (e.g., a texture or boundary of an object) may be expressed with more clusters through image analysis. That is, finer clustering may be performed on an area having a higher complexity, e.g., complexity of shape or complexity of motion.

The clustering module 511 may express a pixel-wise optical flow as a currently estimated cluster-wise optical flow by interpreting a statistical correlation between data and optical flows in the process of learning by self-supervised learning or unsupervised learning.

The cluster-wise motion compensation module 513 may generate a predicted frame (e.g., a P-frame) by performing cluster-wise warping on the reference frame. The residual encoder 533 may encode a residual corresponding to a difference between the predicted frame and the current frame. The residual decoder 515 may generate a decoded frame by adding the predicted frame and the decoded residual and may store the decoded frame in the decoded frame buffer 550.

As shown in the example of FIG. 6, the cluster-wise motion compensation module 513 may generate a probability-weighted reference frame based on the reference frame and a pixel-wise assignment probability (or a clustering probability). In operation 610, the cluster-wise motion compensation module 513 may perform cluster-wise translation followed by summation based on the weighted reference frame. In operation 630, the cluster-wise motion compensation module 513 may generate a weight map by performing cluster-wise translation followed by summation based on the assignment probability and the cluster-wise motion vector.

The cluster-wise motion compensation module 513 may generate an initially predicted frame by performing normalization based on the weight map and a result of operation 610. In operation 670, the cluster-wise motion compensation module 513 may generate a predicted frame (e.g., a P-frame) by concatenating the initially predicted frame with the weight map and inputting the thus initially predicted frame to a P-frame prediction network.

The decoder 510 may receive the cluster-wise motion vector and a bitstream of a residual from the encoder 530. The decoder 510 may generate the same clustering map using the same clustering module 511 and the reference frame used by the encoder 530. The decoder 510 may generate a predicted frame (e.g., a P-frame) using the same cluster-wise motion compensation module 513 used by the encoder 530. The decoder 510 may reconstruct the residual by decoding the bitstream of the residual through the residual decoder 515 used by the encoder 530. The decoder 510 may generate a decoded frame by adding the predicted frame and the reconstructed residual.

In the example of FIG. 5, the encoder 530 is described as including the decoder 510, which is, however, merely an example. Depending on an example, the encoder 530 and the decoder 510 may be provided separately.

The encoder 530 may use a structure including the decoder 510 and thus ensure that the decoder 510 uses the same reference frame, thereby preventing the accumulation of differences between the encoder 530 and the decoder 510.

Figure 7A:
FIG. 7A illustrates an example of a current frame, according to one or more embodiments.
Figure 7B:
FIG. 7B illustrates an example of a reference frame, according to one or more embodiments.
Figure 7C:
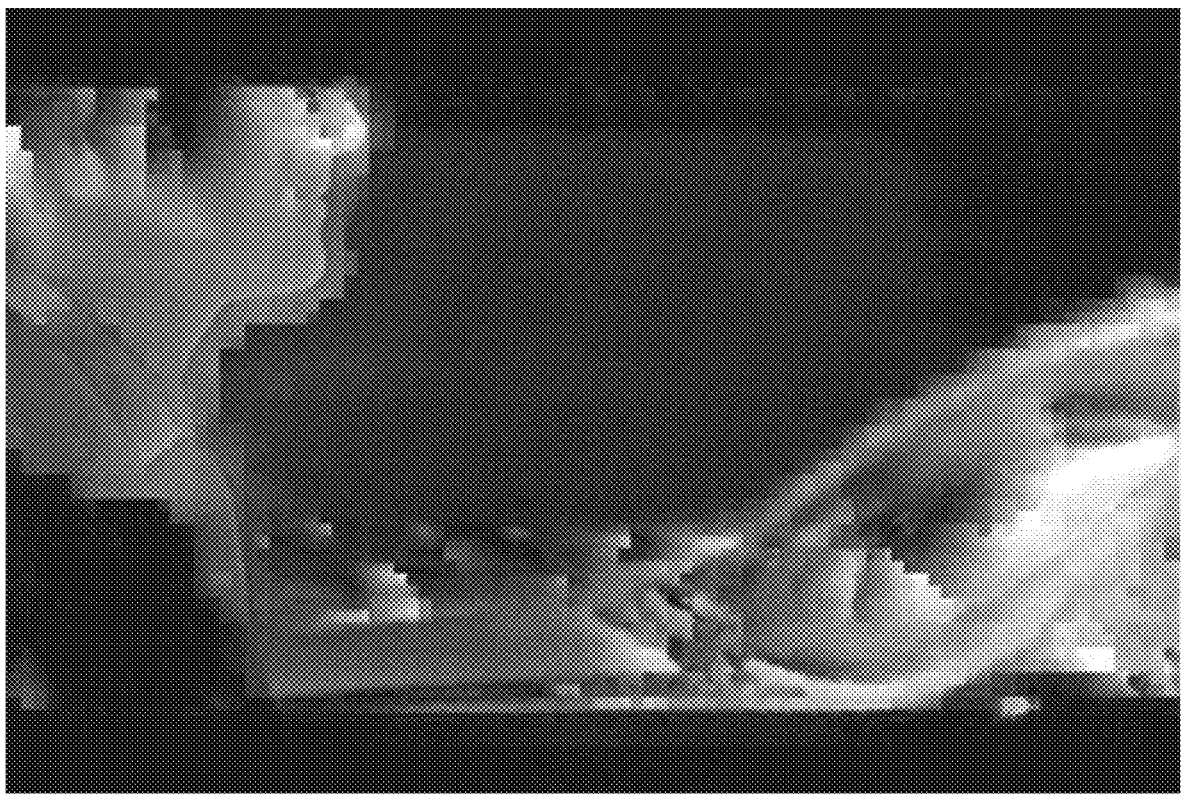
FIG. 7C illustrates an example of a pixel-wise optical flow, according to one or more embodiments.
Figure 7D:
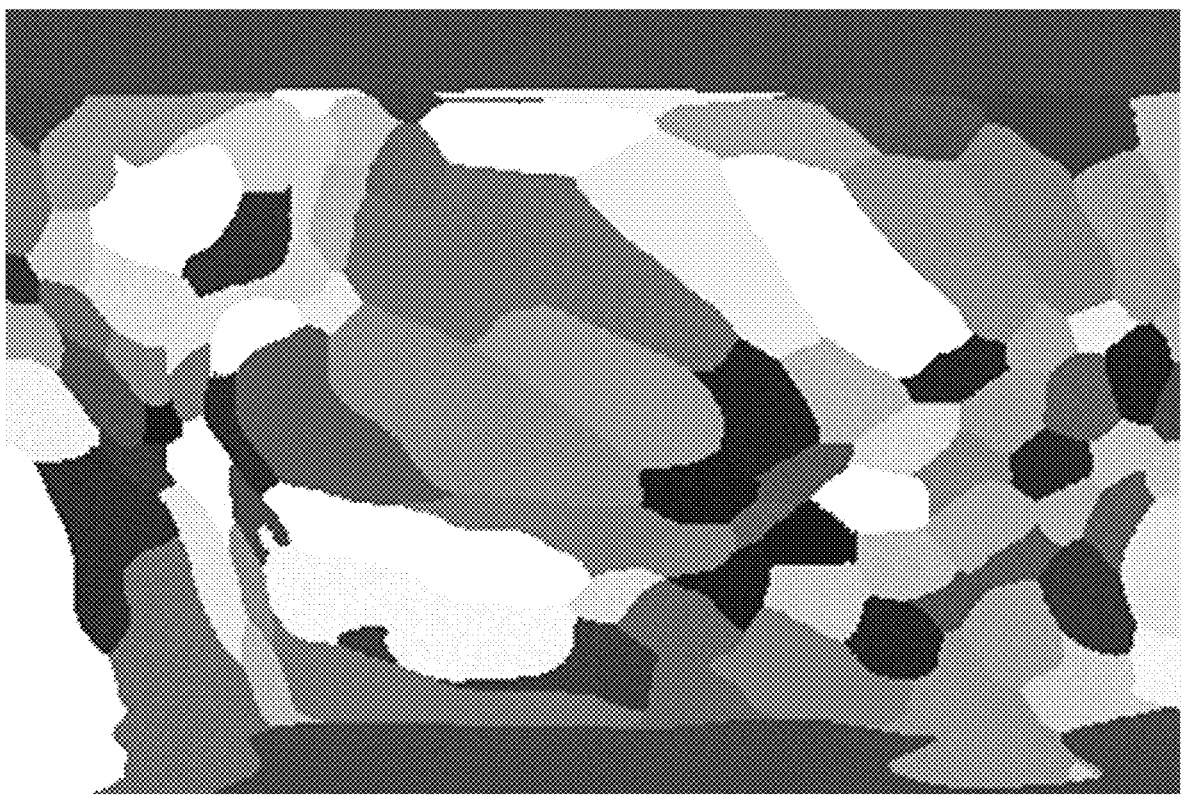
FIG. 7D illustrates an example of a cluster map, according to one or more embodiments.
Figure 7E:
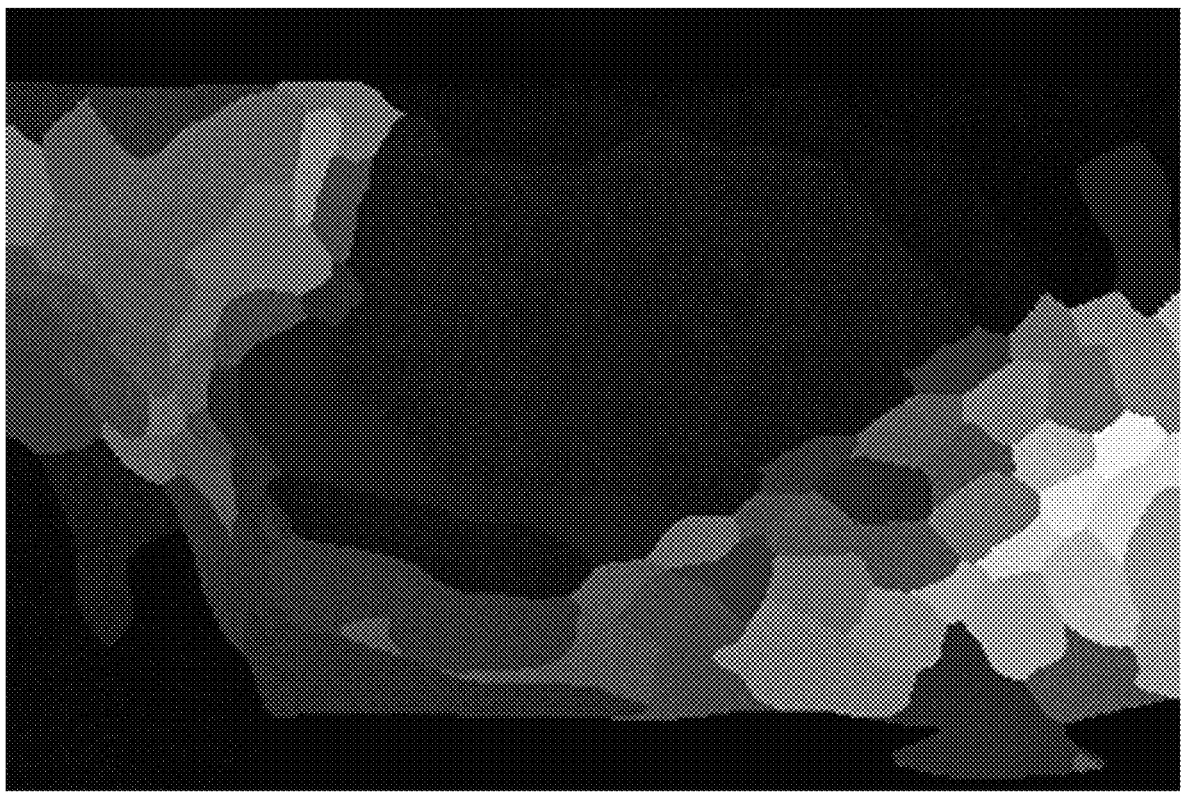
FIG. 7E illustrates an example of a cluster map using a cluster-wise optical flow, according to one or more embodiments.

FIG. 7A illustrates an example of a current frame, FIG. 7B illustrates an example of a reference frame, and FIG. 7C illustrates an example of a pixel-wise optical flow. FIG. 7D illustrates an example of a cluster map, and FIG. 7E illustrates an example of a cluster map using a cluster-wise optical flow.

Figure 8A:
FIG. 8A illustrates an example of a current frame, according to one or more embodiments.
Figure 8B:
FIG. 8B illustrates an example of a reference frame, according to one or more embodiments.
Figure 8C:
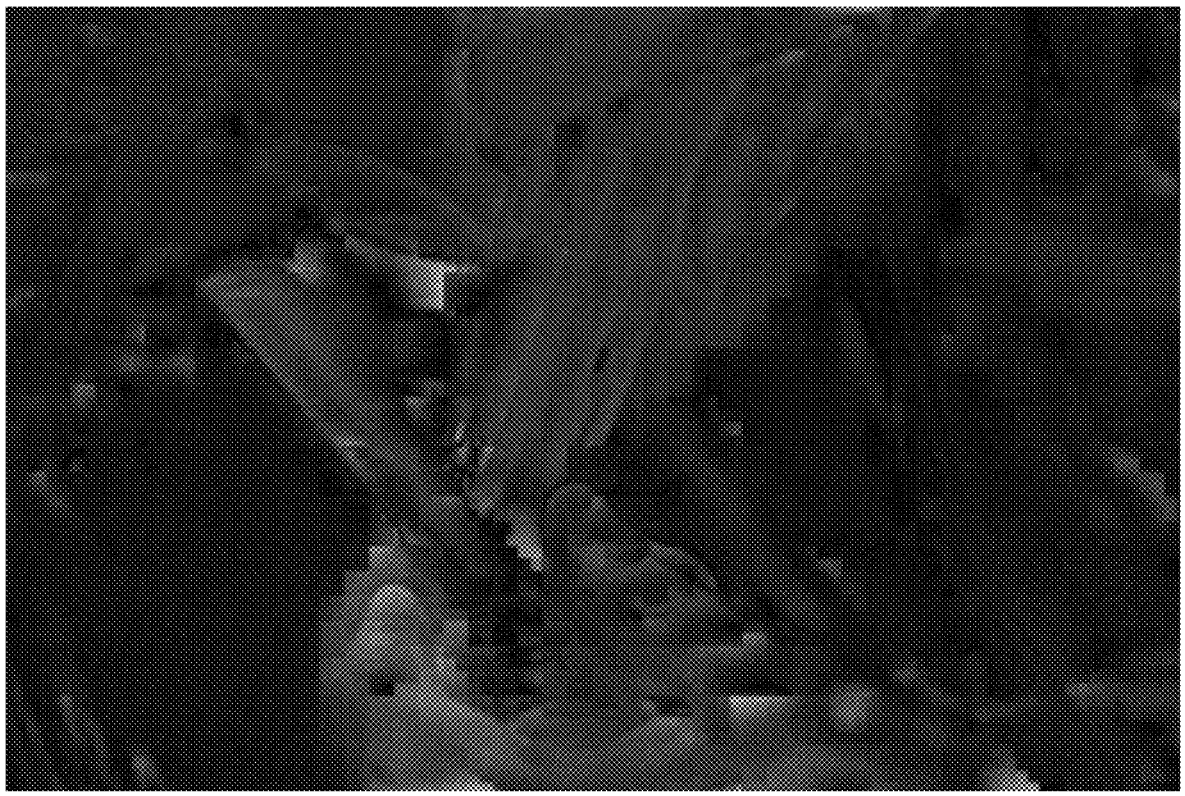
FIG. 8C illustrates an example of a pixel-wise optical flow, according to one or more embodiments.
Figure 8D:
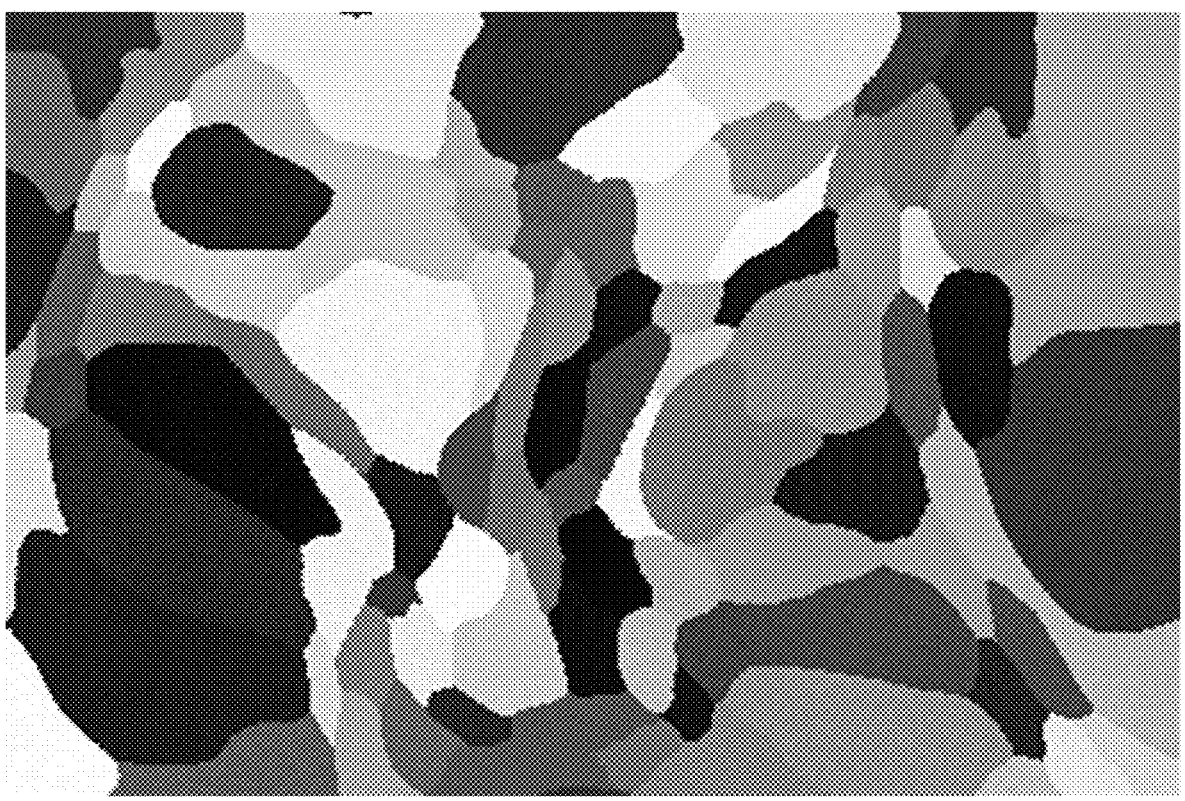
FIG. 8D illustrates an example of a cluster map, according to one or more embodiments.
Figure 8E:
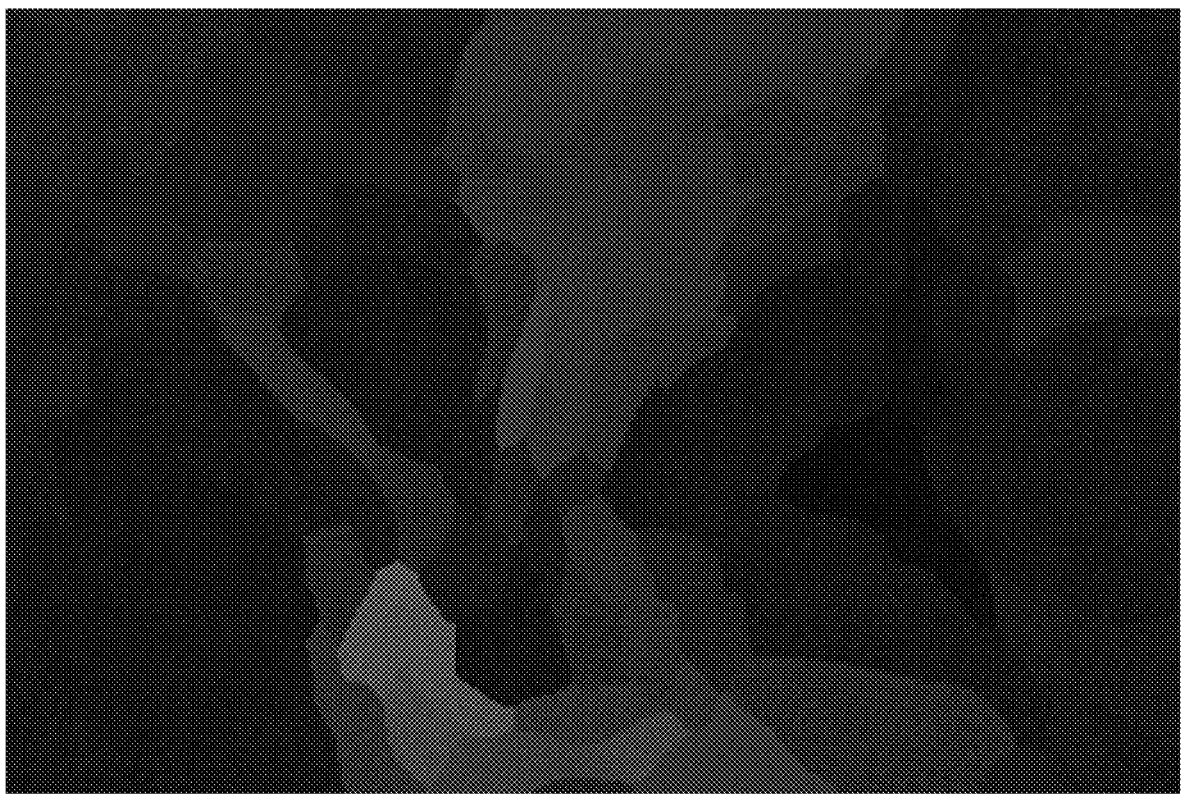
FIG. 8E illustrates an example of a cluster map using a cluster-wise optical flow, according to one or more embodiments.

FIG. 8A illustrates an example of a current frame, FIG. 8B illustrates an example of a reference frame, and FIG. 8C illustrates an example of a pixel-wise optical flow. FIG. 8D illustrates an example of a cluster map, and FIG. 8E illustrates an example of a cluster map using a cluster-wise optical flow.

Referring to FIGS. 7A to 8E, the effects of cluster-wise motion estimation are shown. A processor (e.g., the processor 200 of FIG. 1) may generate a cluster map from a reference frame. The cluster map may be an output of a clustering module obtained by inputting the reference frame thereto. The cluster map may represent a portion expected to have a high probability of having a similar motion in the reference frame. The processor 200 may obtain a cluster-wise optical flow from the cluster map.

The cluster-wise optical flow may have fewer bits than a pixel-wise optical flow. For example, the cluster-wise optical flow may have fewer bits than a pixel-wise optical flow when the pixel-wise optical flow is compressed in a latent space.

The processor 200 may simulate the pixel-wise optical flow through the cluster map using the cluster-wise optical flow. The processor 200 may perform video compression with a high compression rate through the cluster map using the cluster-wise optical flow. Since the reference frame may already be shared by both the encoder and the decoder, separate data transmission may not be required to generate the generate the cluster map. The processor 200 may achieve a high compression rate by transmitting only a few cluster-wise optical flows (or motion vectors) having relatively few bits.

Figure 9:
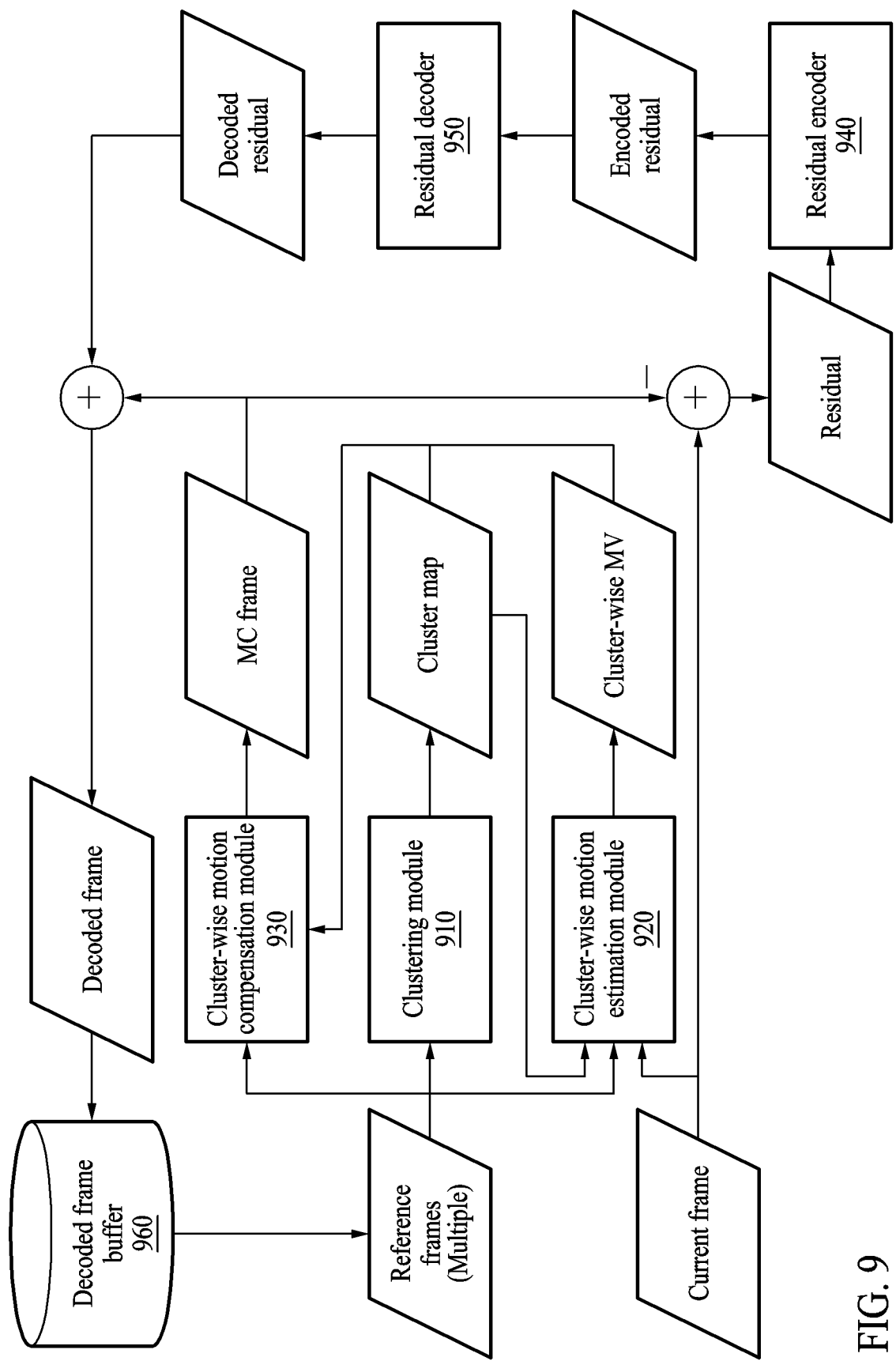
FIG. 9 illustrates an example of implementation of the video processing apparatus of FIG. 1, according to one or more embodiments.

FIG. 9 illustrates an example of implementation of the video processing apparatus of FIG. 1, according to one or more examples.

Referring to FIG. 9, a processor (e.g., the processor 200 of FIG. 1) may include a clustering module 910, a cluster-wise motion estimation module 920, a cluster-wise motion compensation module 930, a residual encoder 940, and a residual decoder 950. A memory (e.g., the memory 300 of FIG. 1) may include a decoded frame buffer 960.

The clustering module 910 may perform clustering using a reference frames of previous points in time as an input, rather than using a single reference frame. By additionally using the reference frames of the previous points in time (e.g., t-1, t-2, ... ), the clustering module 910 may better find a portion expected to move in the current reference frame and calculate a more accurate cluster map.

The other operations of the clustering module 910, the cluster-wise motion estimation module 920, the cluster-wise motion compensation module 930, the residual encoder 940, the residual decoder 950, and the decoded frame buffer 960 may be the same as those of the clustering module 410, the cluster-wise motion estimation module 420, the cluster-wise motion compensation module 430, the residual encoder 440, the residual decoder 450, and the decoded frame buffer 460 of FIG. 4, respectively.

Figure 10:
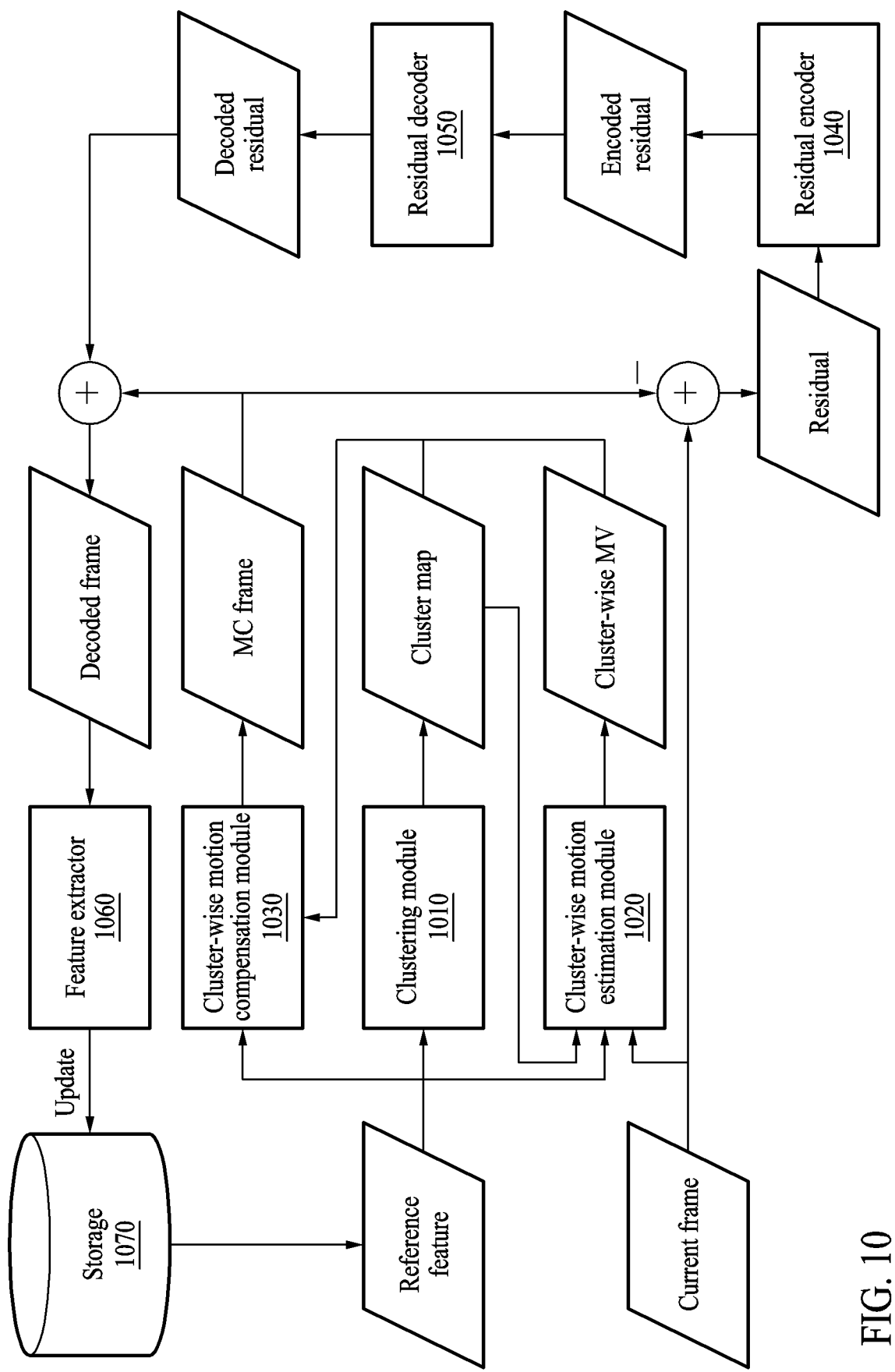
FIG. 10 illustrates an example of implementation of the video processing apparatus of FIG. 1, according to one or more embodiments.

FIG. 10 illustrates an example of implementation of the video processing apparatus of FIG. 1, according to one or more embodiments.

Referring to FIG. 10, a processor (e.g., the processor 200 of FIG. 1) may include a clustering module 1010, a cluster-wise motion estimation module 1020, a cluster-wise motion compensation module 1030, a residual encoder 1040, a residual decoder 1050, and a feature extractor 1060. A memory (e.g., the memory 300 of FIG. 1) may include a storage 1070.

The processor 200 may use all sequence data of all points in time (or for a moving time window) in a manner of updating reference features by extracting features from a decoded frame of each point in time using a DNN-based feature extractor, rather than directly storing an image using a decoded frame buffer.

The processor 200 may transmit information accumulated up to a previous point in time to all the modules using the reference features as an input of the clustering module 1010, the cluster-wise motion estimation module 1020, and the cluster-wise motion compensation module 1030. By transmitting the accumulated information to all the modules, the processor 200 may achieve high performance with respect to a video sequence having temporal continuity (e.g., a continuing same scene).

Figure 11:
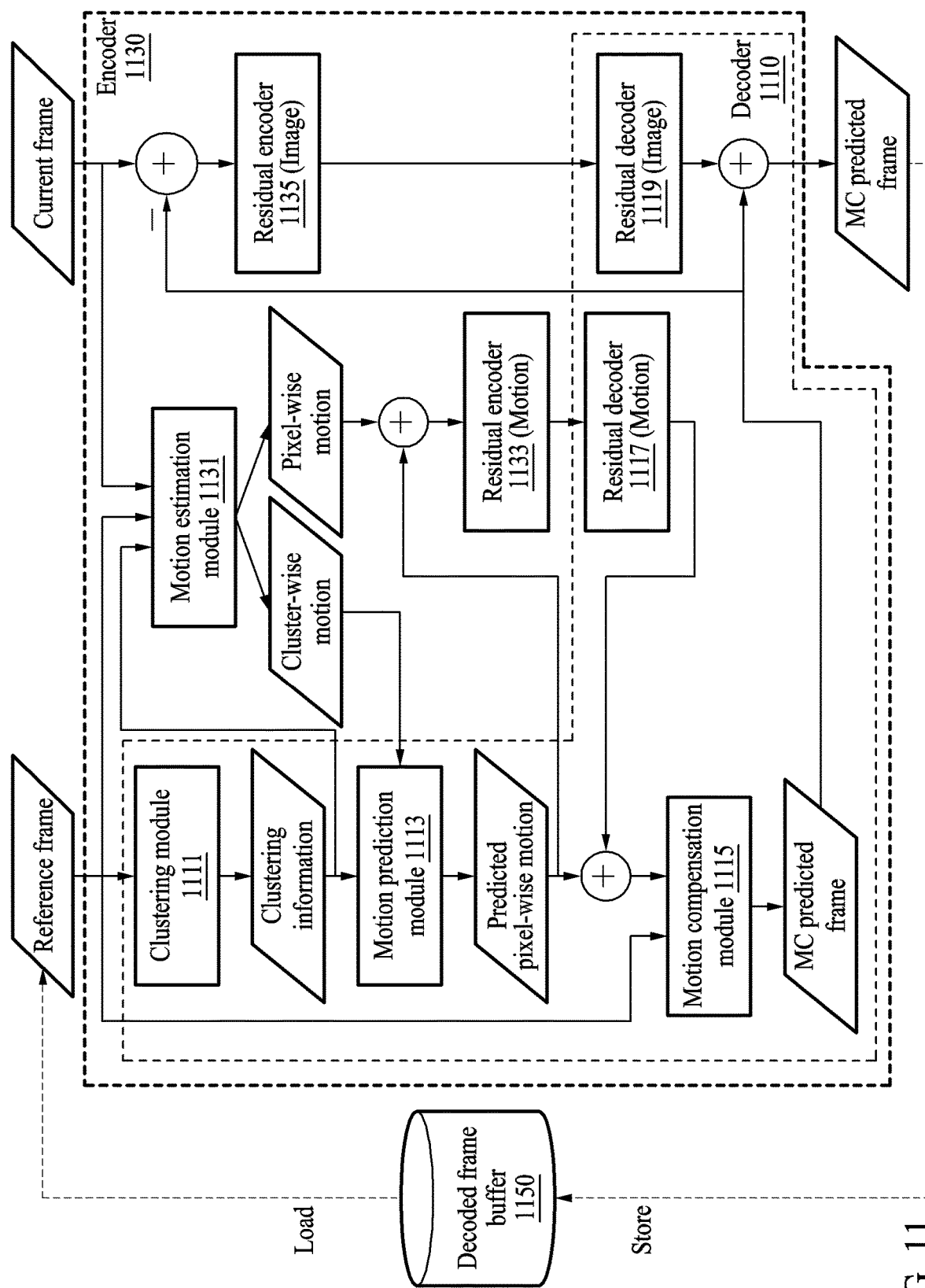
FIG. 11 illustrates an example of a video processing operation, according to one or more embodiments.

FIG. 11 illustrates an example of a video processing operation, according to one or more embodiments.

Referring to FIG. 11, a processor (e.g., the processor 200 of FIG. 1) may use an additional motion vector to increase the accuracy of motion compensation of a cluster-wise motion vector. Data transmitted by a decoder 1110 or an encoder 1130 may include a bitstream corresponding to a cluster-wise motion vector and a residual motion vector and a bitstream corresponding to a residual. The cluster-wise motion vector may be a vector itself or data transformed into a form suitable for transmission. The processor 200 may increase the accuracy of the motion compensation of the cluster-wise motion vector by additionally using the bitstream corresponding to the residual motion vector.

The encoder 1130 may include the decoder 1110. The decoder 1110 may include a clustering module 1111, a motion prediction module 1113, a motion compensation module 1115, a residual motion decoder 1117, and a residual decoder 1119. The encoder 1130 may include a motion estimation module 1131, a residual motion encoder 1133, and a residual encoder 1135.

The clustering module 1111 may estimate clustering information (e.g., an assignment probability) and a cluster-wise motion vector (e.g., a first motion vector) in the same manner as the clustering module 511 of FIG. 5.

The motion prediction module 1113 may generate a predicted pixel-wise motion vector (e.g., a second motion vector) using the clustering information and the cluster-wise motion vector. The motion prediction module 1113 may generate the predicted pixel-wise motion vector by calculating a cluster-wise motion vector according to a pixel-wise cluster. Alternatively, the motion prediction module 1113 may generate the predicted pixel-wise motion vector by calculating an expected value using the cluster-wise motion vector and a probability of being assigned to a pixel-wise cluster.

The processor 200 may calculate a residual motion vector (e.g., a motion residual) that is a difference between the predicted pixel-wise motion vector and the original pixel-wise motion vector obtained based on a current frame and a reference frame. The residual motion encoder 1133 may transform the residual motion vector into a bitstream and transmit the bitstream. The residual motion decoder 1117 may restore the residual motion vector from the bitstream.

Since the residual motion vector is obtained by removing an amount of information corresponding to a predictable portion from the original pixel-wise motion vector, it may be more efficient than directly compressing the original pixel-wise motion vector.

The residual motion encoder 1133 and the residual encoder 1135 may be implemented separately. The residual encoder 1135 may operate in the same manner as the residual encoder 533 of FIG. 5.

The residual motion decoder 1117 and the residual decoder 1119 may be implemented separately. The residual decoder 1119 may operate in the same manner as the residual decoder 515 of FIG. 5.

The processor 200 may obtain a finally restored pixel-wise motion vector by adding the restored residual motion vector and the predicted pixel-wise motion vector. The motion compensation module 1115 may then perform motion compensation using the finally restored pixel-wise motion vector.

The motion compensation module 1115 may warp the reference frame with the finally restored pixel-wise motion vector. Alternatively, the motion compensation module 1115 may perform motion compensation using a neural network having the finally restored pixel-wise motion vector and the reference frame as an input.

Figure 12:
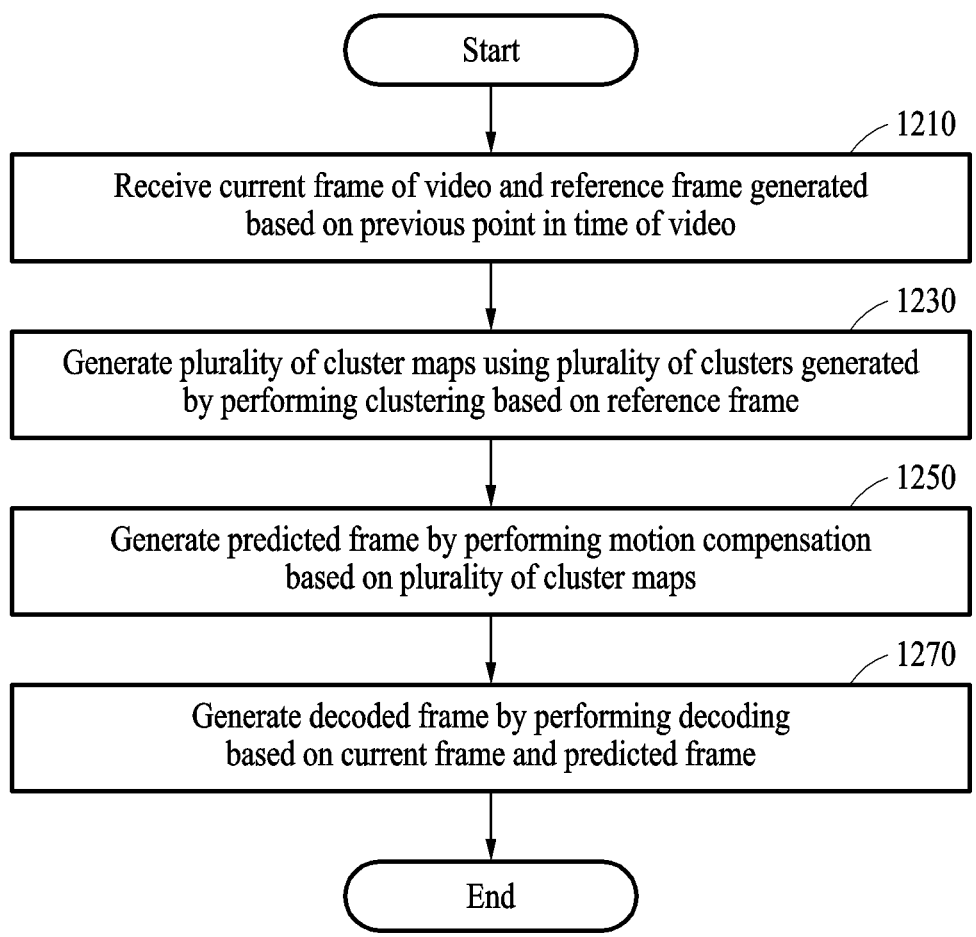
FIG. 12 illustrates an example of an operation of the video processing apparatus of FIG. 1, according to one or more embodiments Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

FIG. 12 illustrates an example of an operation of the video processing apparatus of FIG. 1.

Referring to FIG. 12, in operation 1210, a receiver (e.g., the receiver 100 of FIG. 1) may receive a current frame of a video and a reference frame generated for a previous point in time of the video.

In operation 1230, the processor 200 may generate a cluster maps using clusters generated by performing clustering based on the reference frame. The reference frame may be generated based on a decoded frame of the previous point in time.

The processor 200 may calculate an assignment probability for clustering based on the reference frame. The processor 200 may calculate an optical flow based on the reference frame and the current frame. The processor 200 may generate a representative motion vector of the clusters based on the assignment probability and the optical flow.

The processor 200 may calculate an average of optical flows corresponding to the clusters based on the assignment probability and the optical flow. The processor 200 may calculate an accuracy of the assignment probability based on a difference between the average and an optical flow corresponding to a pixel assigned to the clusters.

The processor 200 may estimate motion vectors corresponding to the clusters based on the reference frame, the current frame, and the cluster maps.

In operation 1250, the processor 200 may generate a predicted frame by performing motion compensation based on the cluster maps. The processor 200 may generate the predicted frame by compensating motion for the reference frame based on the cluster maps and the motion vectors.

The processor 200 may motion-compensate the reference frame using the sum of the motion vectors. Alternatively, the processor 200 may motion-compensate the reference frame using a pixel-wise motion vector by performing warping based on the cluster maps and the motion vectors.

In operation 1270, the processor 200 may generate a decoded frame by performing decoding based on the current frame and the predicted frame.

The processor 200 may generate a residual based on the current frame and the predicted frame. The processor 200 may generate an encoded residual by encoding the residual. The processor 200 may generate a decoded residual by decoding the encoded residual.

The processor 200 may generate the decoded frame based on the predicted frame and the decoded residual.

The processor 200 may generate a first motion vector corresponding to the clusters based on the reference frame, the current frame, and the cluster maps. The processor 200 may generate a second motion vector corresponding to a pixel based on an assignment probability corresponding to the clusters and the first motion vector.

The processor 200 may calculate a motion residual based on the reference frame, the current frame, and the second motion vector. The processor 200 may generate the predicted frame by performing the motion compensation based on the motion residual and the second motion vector.

The computing apparatuses, the electronic devices, the processors, the memories, the displays, the information output system and hardware, the storage devices, and other apparatuses, devices, units, modules, and components described herein with respect to FIGS. 1-12 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A computing apparatus, comprising:
   one or more processors; and
   storage storing instructions configured to, when executed by the one or more processors, cause the one or more processors to:
      generate cluster maps using clusters generated by performing clustering, wherein the generating the cluster maps is performed based on a reference frame of a video generated based on a previous point in time of the video;
      generate a predicted frame by performing motion compensation based on the cluster maps, including estimating motion vectors corresponding to the clusters based on the reference frame, a current frame of the video, and the cluster maps; and
      generate a decoded frame by performing decoding based on the current frame and the predicted frame.

2. The computing apparatus of claim 1, wherein the reference frame is generated based on a decoded frame of the previous point in time.

3. The computing apparatus of claim 1, wherein the instructions are further configured to cause the one or more processors to generate the predicted frame by compensating the reference frame based on the cluster maps and the motion vectors.

4. The computing apparatus of claim 3, wherein the instructions are further configured to cause the one or more processors to:
   motion-compensate the reference frame using a sum of the motion vectors, or
   motion-compensate the reference frame using a pixel-wise motion vector by performing warping based on the cluster maps and the motion vectors.

5. The computing apparatus of claim 1, wherein the instructions are further configured to cause the one or more processors to:
   calculate an assignment probability for clustering based on the reference frame,
   calculate an optical flow based on the reference frame and the current frame, and
   generate a representative motion vector of the clusters based on the assignment probability and the optical flow.

6. The computing apparatus of claim 5, wherein the instructions are further configured to cause the one or more processors to:
calculate an average of optical flows corresponding to the clusters based on the assignment probability and the optical flow, and
calculate an accuracy of the assignment probability based on a difference between the average and an optical flow corresponding to a pixel assigned to the clusters.

7. The computing apparatus of claim 3, wherein the instructions are further configured to cause the one or more processors to:
generate a residual based on the current frame and the predicted frame,
generate an encoded residual by encoding the residual, and
generate a decoded residual by decoding the encoded residual.

8. The computing apparatus of claim 7, wherein
the processor is configured to generate the decoded frame based on the predicted frame and the decoded residual.

9. The computing apparatus of claim 1, wherein the instructions are further configured to cause one or more processors to:
generate a first motion vector corresponding to the clusters based on the reference frame, the current frame, and the cluster maps,
generate a second motion vector corresponding to a pixel based on an assignment probability corresponding to the clusters and the first motion vector,
calculate a motion residual based on the reference frame, the current frame, and the second motion vector, and
generate the predicted frame by performing the motion compensation based on the motion residual and the second motion vector.

10. A video processing method, comprising:
receiving a current frame of a video and a reference frame generated based on a previous point in time of the video;
generating cluster maps using clusters, the clusters generated by performing clustering based on the reference frame;
generating a predicted frame by performing motion compensation based on the cluster maps, including estimating motion vectors corresponding to the clusters based on the reference frame, the current frame, and the cluster maps; and
generating a decoded frame by performing decoding based on the current frame and the predicted frame.

11. The video processing method of claim 10, wherein the reference frame is generated based on a decoded frame of the previous point in time.

12. The video processing method of claim 10, wherein the predicted frame is generated by compensating the reference frame based on the cluster maps and the motion vectors.

13. The video processing method of claim 12, wherein the generating of the predicted frame comprises:
compensating the reference frame using a sum of the motion vectors; or
compensating the reference frame using a pixel-wise motion vector by performing warping based on the cluster maps and the motion vectors.

14. The video processing method of claim 12, wherein the generating of the decoded frame comprises:
generating a residual based on the current frame and the predicted frame;
generating an encoded residual by encoding the residual; and
generating a decoded residual by decoding the encoded residual.

15. The video processing method of claim 14, wherein the generating of the decoded frame further comprises generating the decoded frame based on the predicted frame and the decoded residual.

16. The video processing method of claim 10, wherein the generating of the predicted frame comprises:
generating a first motion vector corresponding to the clusters based on the reference frame, the current frame, and the cluster maps;
generating a second motion vector corresponding to a pixel based on an assignment probability corresponding to the clusters and the first motion vector;
calculating a motion residual based on the reference frame, the current frame, and the second motion vector; and
generating the predicted frame by performing the motion compensation based on the motion residual and the second motion vector.

17. The video processing method of claim 10, wherein the generating of the cluster maps comprises:
calculating an assignment probability for clustering based on the reference frame;
calculating an optical flow based on the reference frame and the current frame; and
generating a representative motion vector of the clusters based on the assignment probability and the optical flow.

18. The video processing method of claim 17, wherein the generating of the cluster maps comprises:
calculating an average of optical flows corresponding to the clusters based on the assignment probability and the optical flow; and
calculating an accuracy of the assignment probability based on a difference between the average and an optical flow corresponding to a pixel assigned to the clusters.

19. A video processing method, comprising:
receiving a current frame of a video and a reference frame generated based on a previous point in time of the video;
generating cluster maps using clusters, the clusters generated by performing clustering based on the reference frame;
generating a predicted frame by performing motion compensation based on the cluster maps; and
generating a decoded frame by performing decoding based on the current frame and the predicted frame, wherein the generating of the cluster maps comprises:
calculating an assignment probability for clustering based on the reference frame;
calculating an optical flow based on the reference frame and the current frame; and
generating a representative motion vector of the clusters based on the assignment probability and the optical flow.

20. The video processing method of claim 19, wherein the generating of the cluster maps comprises:
calculating an average of optical flows corresponding to the clusters based on the assignment probability and the optical flow; and calculating an accuracy of the assignment probability based on a difference between the average and an optical flow corresponding to a pixel assigned to the clusters.

\* \* \* \* \*